(12) United States Patent
Sanders

(10) Patent No.: US 11,196,571 B2
(45) Date of Patent: Dec. 7, 2021

(54) CRYPTOGRAPHIC METHOD FOR GROUP SIGNATURE

(71) Applicant: ORANGE, Issy-les-Moulineaux (FR)

(72) Inventor: Olivier Sanders, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/955,426

(22) PCT Filed: Dec. 18, 2018

(86) PCT No.: PCT/FR2018/053363
§ 371 (c)(1),
(2) Date: Jun. 18, 2020

(87) PCT Pub. No.: WO2019/122679
PCT Pub. Date: Jun. 27, 2019

(65) Prior Publication Data
US 2021/0006414 A1   Jan. 7, 2021

(30) Foreign Application Priority Data
Dec. 19, 2017 (FR) ...................... 1762480

(51) Int. Cl.
*H04L 29/06* (2006.01)
*H04L 9/32* (2006.01)
*H04L 9/08* (2006.01)

(52) U.S. Cl.
CPC .......... *H04L 9/3255* (2013.01); *H04L 9/085* (2013.01); *H04L 9/0825* (2013.01); *H04L 9/0861* (2013.01); *H04L 9/3218* (2013.01)

(58) Field of Classification Search
None
See application file for complete search history.

(56) References Cited

U.S. PATENT DOCUMENTS 7,590,850 B2 * 9/2009 Kim ...................... H04L 9/3255
713/176
8,078,876 B2 * 12/2011 Brickell ................ H04L 9/3073
713/176
(Continued)

OTHER PUBLICATIONS

International Search Report dated Mar. 29, 2020 for corresponding International Application No. PCT/FR2018/053363, filed Dec. 18, 2018.
(Continued)

*Primary Examiner* — Maung T Lwin
(74) *Attorney, Agent, or Firm* — David D. Brush; Westman, Champlin & Koehler, P.A.

(57) ABSTRACT

A cryptographic method for signing a message m by a user device on behalf of a group managed by a group manager, which has a secret key generated from two variates x and y, the group having a public key formed from a plurality of elements comprising an element g and an element gz pertaining to a cyclic group of order p, p being a whole prime number and z a variate, and an element h, an element hx, an element h1/z and an element hy/z pertaining to a cyclic group of order p. The method includes: receiving a certificate from the group manager, including elements S1=gr, S2=gr(x+y.u) and S3=gz.r where r is a variate selected by the group manager for the user device; and generating a group signature for the message m, based on the certificate, a variate t generated by the user device, and the secret u.

8 Claims, 3 Drawing Sheets

(56) References Cited

U.S. PATENT DOCUMENTS

| | | | | |
|---|---|---|---|---|
| 8,245,047 | B2* | 8/2012 | Zaccone | H04L 9/0833 |
| | | | | 713/180 |
| 8,527,777 | B2* | 9/2013 | Camenisch | H04L 9/3231 |
| | | | | 713/186 |
| 8,966,273 | B2* | 2/2015 | Hwang | H04L 9/3255 |
| | | | | 713/176 |
| 2009/0024852 | A1* | 1/2009 | Yonezawa | H04L 9/3255 |
| | | | | 713/180 |
| 2009/0276630 | A1* | 11/2009 | Teranishi | H04L 9/3033 |
| | | | | 713/176 |
| 2014/0181513 | A1* | 6/2014 | Marek | H04W 12/50 |
| | | | | 713/168 |
| 2017/0230182 | A1* | 8/2017 | Misoczki | H04L 9/3247 |

OTHER PUBLICATIONS

Written Opinion of the International Searching Authority dated Mar. 29, 2020 for corresponding International Application No. PCT/FR2018/053363, filed Dec. 18, 2018.

Lan Nguyen et al., "Efficient and Provably Secure Trapdoor-free Group Signature Schemes from Bilinear Pairings", International Association for Cryptologic Research, vol. 20050501:081915, Apr. 27, 2005 (Apr. 27, 2005), pp. 1-28, XP061001172.

Laila El Aimani et al., "Efficient Group Signatures in the Standard Model" International Association for Cryptologic Research, vol. 20121126:102332, Nov. 26, 2012 (Nov. 26, 2012), pp. 1-23, XP061006983.

David Derler et al., "Fully-Anonymous Short Dynamic Group Signatures Without Encryption", International Association for Cryptographic Research, vol. 20160928:105941, Sep. 28, 2016 (Sep. 28, 2016), pp. 1-30, XP061021843.

English translation of the Written Opinion of the International Searching Authority dated Apr. 9, 2019 for corresponding International Application No. PCT/FR2018/053363, filed Dec. 18, 2018.

Pointcheval, D. et al., "Short Randomizable Signature", Proceedings of the Cryptographers Track, RSA Conference, Feb. 29-Mar. 4, 2016.

F. Vercauteren, "Optimal Pairings", IEEE Transactions on Information Theory, vol. 56, No. 1, Jan. 2010, or in the book by J. Silverman titled « The Arithmetic of Elliptic Curves », in chapter XI.

C. P. Schnorr, "Efficient Identification and signatures for smart cards", Advances in Cryptology, CRYPTO'89, LNCS 435, pp. 239-252, 1990.

* cited by examiner

CRYPTOGRAPHIC METHOD FOR GROUP SIGNATURE

CROSS-REFERENCE TO RELATED APPLICATIONS

This Application is a Section 371 National Stage Application of International Application No. PCT/FR2018/053363, filed Dec. 18, 2018, the content of which is incorporated herein by reference in its entirety, and published as WO 2019/122679 on Jun. 27, 2019, not in English.

BACKGROUND OF THE INVENTION

The invention relates to the general field of telecommunications and relates more particularly to securing exchanges between communication devices by means of cryptographic techniques such as electronic signature techniques.

The growing development of the Internet of Things (IoT) where multiple communicating objects of any kind (ex. smart cards, smart telephones, sensors, etc.), often of low power, communicate directly with each other brings up considerable security problems. In fact, this novel model is no longer compatible with classic centralised architectures where an authority intervenes in all communications to guarantee the authenticity of exchanges.

One solution consists of using standard techniques of electronic signature. But the consequence of this is enabling identification and tracing objects making use of them. This problem is far from being significant for the manufacturers of these objects, since they then have to ensure that the objects they are producing respect the regulations in countries where they will be sold as protection of personal data. Now, these regulations tend to be getting severer, as shown by the general data protection regulation (or GDPR for General Data Protection Regulation) recently adopted by the European Union.

In this context, anonymous cryptographic authentication mechanisms prove to be of particular interesting. The latter ensure both authentication of the communicating object ("this concerns a valid communicating object produced by manufacturer X") but also its untraceability (except maybe for a specific entity, it is not possible to identify the object in question), and this ensures their compatibility with the various regulations on the protection of personal data. These mechanisms, and especially DAA mechanisms (for Direct Anonymous Attestation) of direct anonymous attestation and EPID (for Enhanced Privacy ID), are proving highly successful these days: DAA are deployed in over 500 million portable computers while EPID are used in over 2 billion processors.

These anonymous authentication mechanisms are based for the most on a particular cryptographic tool called "group signature". The signature group lets members of a predefined group send signatures on any message with the guarantee of remaining anonymous within the group. More specifically, given a valid signature group, even for the members of the group (other than the signatory himself) it is impossible to know who of them sent it. However, to avoid abuse it is possible to give a specific entity, generally called opening authority, the capacity to lift the anonymity of any group signature.

These different properties turn a group signature into a relatively complex object. Their many potential applications have however caused immense interest within the cryptographic community, reflected by progressive improvement in the performance of group signatures.

The majority of techniques of group signature follows the same construction principle, formalised by Bellare et al: each group signature S contains a certificate of the signatory masked either by encryption or by regeneration techniques, as well as proof of non-interactive knowledge ensuring that the signature S is well formed. It utilises more or less complex operations performed in a bilinear group comprising a set of three cyclic groups G1, G2 and GT and a bilinear coupling e: G1×G2->GT.

The complexity of a group signature (in terms of calculation and dimension) results from the complexity of the certificate it contains to which the complexity of the proof of knowledge is added. The sole truly effective proofs of non-interactive knowledge of the prior art utilise the idealised model of the random oracle (ROM), the limits of which in terms of security are substantial. These limits therefore also transpose to the group signatures making use of them.

The document by Pointcheval and Sanders titled "Short Randomizable Signature", Proceedings of the Cryptographers Track, RSA Conference, 29 Feb.—4 Mar. 2016, describes a highly effective group signature scheme. According to this scheme, each group signature comprises two group elements and 2 scalars of the same size. Generating the signature involves evaluating a bilinear coupling or exponentiation in the group GT. These two operations are very costly and require the use of relatively complex arithmetic in non-first finite fields. These constraints can unfortunately be blocking for low-power communicating objects.

There is therefore a need for an efficacious group signature mechanism in terms of security and less complex than the scheme by Pointcheval and Sanders to allow its implementation in communicating objects having limited capacities in terms of calculation power.

AIM AND SUMMARY OF THE INVENTION

The invention responds especially to this need by proposing a cryptographic method for signing a message m, by a user device, on behalf of a group, this group being managed by a group manager having a secret key generated from two variates x and y, the group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p, said cryptographic signing method comprising:

a step of receiving, after having proved to the manager of the group knowledge of a secret u selected by the user device, a certificate C provided by the manager of the group comprising an element $S1=g^r$, an element $S2=g^{r(x+y \cdot u)}$ and an element $S3=g^{z \cdot r}$ where r designates a variate selected by the manager of the group for the user device; and a step of generating a group signature for the message m, from the certificate (S1,S2,S3) provided by the manager of the group, a variate t generated by the user device, and the secret u, the generated group signature comprising an element $T1=S1^t$, an element $T2=(S2 \cdot S1^{u \cdot m})^t$ and an element $T3=S3^{u \cdot t}$.

Correlatively, another aim of the invention is a user device capable of signing a message m on behalf of a group, this group being managed by a group manager having a secret key generated from two variates x and y, the group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p. According to the invention, the user device comprises:
- a selection module, configured to select a secret u for the user device;
- a proof module, configured to prove to the manager of the group knowledge of the secret u;
- a receiving module, capable of receiving, after having proved to the manager of the group knowledge of the secret u, a certificate C provided by the manager of the group comprising an element $S1=g^r$, an element $S2=g^{r(x+y.u)}$ and an element $S3=g^{z.r}$ where r designates a variate selected by the manager of the group for the user device; and
- a generation module, configured to generate a group signature for the message m, from the certificate (S1, S2,S3) provided by the manager of the group, a variate t generated by the user device, and the secret u, the generated group signature comprising an element $T1=S1^t$, an element $T2=(S2.S1^{u.m})^t$ and an element $T3=S3^{ut}$.

The novel mechanism for group signature proposed by the invention generates a group signature which contains no proof of non-interactive knowledge, reflected by a notable gain in terms of complexity relative to the schemes of group signature of the prior art. Only proof of interactive knowledge is required during set-up of the group signature, which can easily be executed for example by means of a known Schnorr algorithm. This is permitted due to a slight modification of the certificate provided by the manager of the group (elevation to the power u, u designating the secret selected by the user whereof it proves knowledge by the manager of the group) and proposed masking of this certificate due to the variate t in the signature generated.

The signature method of the invention accordingly proposes the shortest group signatures of the state of the art: group signatures generated by the invention in fact contain only three elements of the group G1, reflected by a gain of 25% in terms of dimension relative to the signatures generated by the scheme of Pointcheval and Sanders.

In addition, generation of group signatures by means of the invention advantageously needs no coupling or exponentiation in the group GT, operations known to be very costly in terms of calculation resources and highly complex.

The proposed mechanism also responds to all fixed constraints in terms of security on a group signature: the generated signature ensures anonymity of its signatory and its untraceability. It can be opened by a dedicated opening authority and easily be verified, as described in more detail later.

The invention therefore proposes a mechanism for group signature which can be implemented very simply and effectively in all anonymous authentication systems based on a group signature algorithm. Reduction in size of group signatures generated relative to the prior art and above all the absence of any complex operation during generation of these signatures provide a solution for this invention which is particularly well adapted to communicating objects having limited calculation capacities. However, the invention is not limited to this type of object and can be applied in many fields.

In a particular embodiment, the method comprises a step of calculating an element S3' from the element S3 of the certificate provided by the manager of the group by elevating the element S3 to the power u, said element T3 being calculated during the step of generating the signature by elevating the element S3' calculated during the calculating step to the power t.

This intermediate calculation step offers the possibility of pooling a maximum of operations required for generation of a group signature: the user device can carry out these operations a single time for all the group signatures it will generate thereafter. This improves the efficacy of the proposed signature scheme, especially in terms of fast execution, and even further reduces the complexity required at the user device level for executing this scheme.

In a particular embodiment, the secret key of the manager of the group is formed from the variates x and y and, to prove to the manager of the group the knowledge of the secret u, the user device sends the element $g^u$ to the manager of the group.

This embodiment is particularly simple to execute and is effective. As mentioned previously, the invention is based on proof of interactive knowledge, which can be realised for a secret determined once only while offering the possibility of the user device generating a plurality of group signatures based on this proof of knowledge.

This is not however the only embodiment which can be envisaged, and other implementations of this proof of knowledge can be executed.

In this way, for example, in another embodiment the secret key of the group manager is formed from the elements $g^x$ and $g^y$ and, to prove to the manager of the group the knowledge of the secret u, the user device:
- receives the element $g^y$ from the manager of the group; and
- calculates and sends the element $(g^y)^u$ to the manager of the group.

As mentioned previously, different known algorithms can be used by the user device to prove knowledge of the secret u to the manager of the group. Therefore, for this purpose the user device can for example use the Schnorr algorithm, well known to the skilled person, which permits particularly effective implementation of the group signature method according to the invention.

The invention therefore proposes a scheme for group signature which is particularly effective in terms of security and complexity. To this effect, it is based not only on generation itself of the group signature by the user device, but also on the device manager providing the group with a certificate formed from carefully chosen elements.

Therefore, according to another aspect a further aim of the invention is a cryptographic method of providing a certificate by a manager of a group to a user device joining the group, said group manager having a secret key generated from two variates x and y, said group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p, said cryptographic method of providing comprising:
- a step of obtaining, originating from the user device, proof of knowledge by said user device of a secret u selected by the user device;
- a step of selecting a variate r for the user device;
- a step of generating a certificate for the user device comprising an element $S1=g^r$, an element $S2=g^{r(x+y.u)}$ and an element $S3=g^{z.r}$; and
- a step of sending the generated certificate to the user device.

Correlatively, the invention also relates to a device manager of a group of user devices, said group manager having a secret key generated from two variates x and y, said group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p, said device manager comprising:
- a module for obtaining, configured to obtain from a user device joining said group, proof of knowledge by said user device of a secret u selected by the user device;
- a selection module, configured to select a variate r for the user device;
- a generation module, configured to generate a certificate for the user device comprising an element $S1=g^r$, an element $S2=g^{r(x+y\cdot u)}$ and an element $S3=g^{z\cdot r}$; and
- a module for sending, configured to send the generated certificate to the user device.

As mentioned previously, the group signature proposed by the invention responds to all constraints imposed on a group signature in terms of security (anonymity and untraceability). It can especially be verified by a verification device and can be opened by an opening authority if needed.

Another aim of the invention therefore is a cryptographic method of verification of a group signature comprising three elements T1, T2 and T3, and generated for a message m by a user device belonging to a group of user devices by using a cryptographic method for signing a message m according to the invention, the group having a public key formed by a plurality of elements comprising an element g and an element $g^z$ belonging to a cyclic group G1 of order p, p designating a prime integer and z a variate, and an element h, an element $X=h^x$, an element $Z'=h^{1/z}$ and an element $Y'=h^{y/z}$ belonging to a cyclic group G2 of order p, x and y designating variates used to generate a private key of a manager of the group, said verification method comprising:
- a step of verification of the equality $e(T2,h)=e(T1,X)\cdot e(T3,Y'\cdot Z'^m)$, where e designates a bilinear coupling; and
- if said equality is verified, a step of validation of the group signature.

Correlatively, the invention also relates to a verification device, configured to verify a group signature comprising three elements T1, T2 and T3, and generated for a message m by a user device according to the invention belonging to a group of user devices, said group having a public key formed by a plurality of elements comprising an element g and an element $g^z$ belonging to a cyclic group G1 of order p, p designating a prime integer and z a variate, and an element h, an element $X=h^x$, an element $Z'=h^{1/z}$ and an element $Y'=h^{y/z}$ belonging to a cyclic group G2 of order p, x and y designating variates used to generate a private key of a manager of the group according to the invention, said verification device comprising:
- a verification module, configured to verify the equality $e(T2,h)=e(T1,X)\cdot e(T3,Y'\cdot Z'^m)$, where e designates a bilinear coupling; and
- a validation module of the group signature activated if said equality is verified.

The invention also proposes a cryptographic method of opening a group signature, comprising three elements T1, T2 and T3, and generated for a message m by a user device known as native belonging to a group of user devices by using a cryptographic method for signing a message m according to the invention, the group having a public key formed by a plurality of elements comprising an element g and an element $g^z$ belonging to a cyclic group G1 of order p, p designating a prime integer and z a variate, and an element h, an element $X=h^x$, an element $Z'=h^{1/z}$ and an element $Y'=h^{y/z}$ belonging to a cyclic group G2 of order p, x and y designating variates used to generate a private key of a manager of the group, said opening method comprising:
- a step of receiving, originating from each user device of the group of user devices, an element $h^u$, where u designates the secret selected by this user device to generate signatures on behalf of the group by using the cryptographic method for signing a message m according to the invention;
- a step of opening of the group signature comprising identification of the user device of the group of user devices for which the term $e(T3,Z')$ and the term $e(T1,h^u)$ are equal, where e designates a bilinear coupling defined on the cyclic groups G1 and G2 and having values in the cyclic group GT, and $h^u$ designates the received element originating from this user device;

the native user device of the group signature corresponding to the user device identified during the opening step.

It should be noted that due to the properties of the bilinear coupling e the equality of both terms $e(T3,Z')$ and $e(T1,h^u)$ is verified for a single user device of the group only.

Correlatively, it also proposes an opening device configured to open a group signature comprising three elements T1, T2 and T3, and generated for a message m by a user device known as native belonging to a group of user devices of the invention, said group having a public key formed by a plurality of elements comprising an element g and an element $g^z$ belonging to a cyclic group G1 of order p, p designating a prime integer and z a variate, and an element h, an element $X=h^x$, an element $Z'=h^{1/z}$ and an element $Y'=h^{y/z}$ belonging to a cyclic group G2 of order p, x and y designating variates used to generate a private key of a manager of the group according to the invention, said opening device comprising:
- a receiving module, capable of receiving an element $h^u$ originating from each user device of the group of user devices, where u designates the secret selected by this user device to generate signatures on behalf of the group;
- a module of opening of the group signature, configured to identify as native user device of the group signature, the user device of the group of user devices for which the term $e(T3,Z')$ and the term $e(T1,h^u)$ are equal, where e designates a bilinear coupling defined on the cyclic groups G1 and G2 and having values in the cyclic group GT, and $h^u$ designates the received element originating from this user device.

The invention also relates to a communication system comprising:
- a group of user devices according to the invention; and
- a manager of the group according to the invention.

This communication system can also comprise a verification device according to the invention and/or an opening device according to the invention.

The method of providing a certificate and the device group manager capable of executing this method, the verification method and the verification device capable of executing this method, the opening method and the opening device capable of executing this method, and the communication system proposed by the invention benefit from the same advantages described previously as for the cryptographic method for signature and the user device according to the invention.

In other embodiments, it can be envisaged that the cryptographic method for signature, the method of providing, the verification method, the opening method, the user device, the device group manager, the verification device, the opening device and the communication system according to the invention combined present all or some of the above characteristics.

In a particular embodiment, the different steps of the signature method, the method of providing, the verification method and/or the opening method are determined by computer instructions programs.

As a consequence, the invention also relates to a computer program on an information carrier likely to be executed in a user device or more generally in a computer, this program comprising instructions adapted to performing the steps of a signature method such as described hereinabove, therefore:

a computer program likely to be run in a device manager of a group or more generally in a computer, this program comprising instructions adapted to performing the steps of a method of providing such as described hereinabove;

a computer program likely to be run in a verification device or more generally in a computer, this program comprising instructions adapted to performing the steps of a verification method such as described hereinabove; and a computer program likely to be run in an opening device or more generally in a computer, this program comprising instructions adapted to performing the steps of an opening method such as described hereinabove.

Each of these programs can use any programming language and be in the form of source code, object code, or intermediate code between source code and object code, such as in a partially compiled form, or in any other preferred form.

The invention also relates to an information or recording carrier readable by a computer and comprising instructions of a computer program such as mentioned hereinabove.

The information or recording carrier can be any entity or device capable of storing the program. For example, the carrier can comprise storage means such as ROM, for example a CD ROM or a microelectronic circuit ROM, or even magnetic recording means, for example a hard drive.

On the other hand, the information or recording carrier can be a transmissible carrier such as an electrical or optical signal which can be conveyed via an electrical or optical cable, by radio or by other means. The program according to the invention can be downloaded in particular over a network of Internet type.

Alternatively, the information or recording carrier can be an integrated circuit incorporating the program, the circuit being adapted to execute or be used in the execution of the method in question.

In another embodiment, the different steps of the methods for generation, providing, verification and/or opening are implemented by a silicon chip which comprises transistors adapted to constitute logic gates of a non-programmable cabled logic.

BRIEF DESCRIPTION OF DRAWINGS

Other characteristics and advantages of the present invention will emerge from the description given hereinbelow in reference to the appended drawings which illustrate an exemplary embodiment thereof devoid of any limiting character, in which.

DETAILED DESCRIPTION OF THE INVENTION

Figure 1:
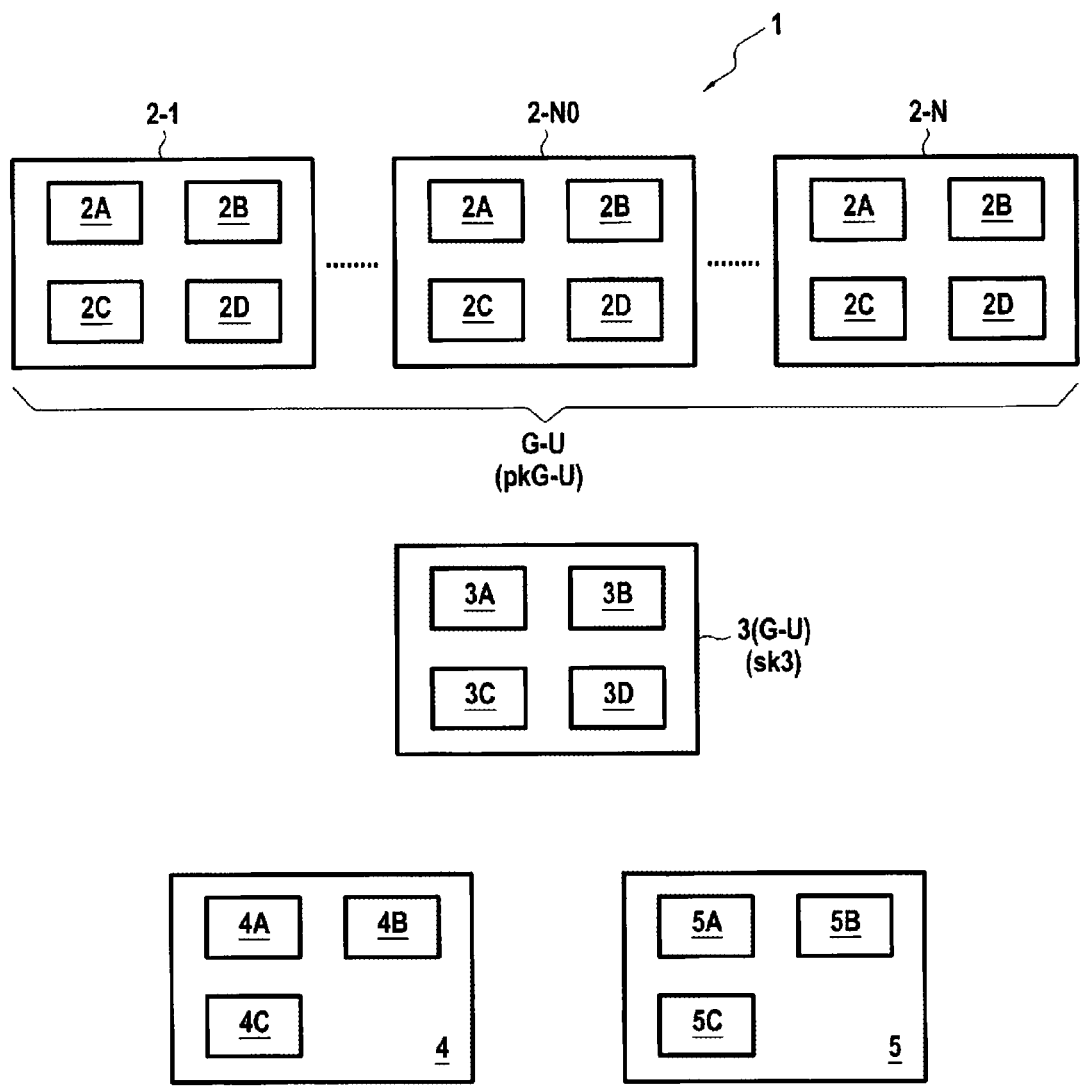
FIG. 1 illustrates, in its environment, a communication system according to the invention in a particular embodiment.

FIG. 1 illustrates, in its environment, a communication system 1 according to the invention, in a particular embodiment.

This system 1 comprises here a plurality of user devices 2-1, 2-2, . . . , 2-N according to the invention, where N designates a whole number greater than or equal to 1. No limitation is attached to the nature of these user devices: they can be any type of communication device or communicating object (ex. sensor, smart telephones, computers, etc.). The invention has preferred but non-limiting application in the realm of the Internet of Things (IoT).

The user devices 2-1, 2-2, . . . , 2-N here form a group of users designated by G-U, managed by a device manager of the group 3, each user device, due to the invention, being able to sign all or some of its communications by means of a group signature. Such a group signature has the advantage of allowing each user device to sign on behalf of the group as well as preserve its anonymity and its untraceability.

To allow generation of such a signature the group has a public cryptographic key, designated by pkG-U. The device manager of the group 3 also has a secret cryptographic key designated by sk3 to enrol especially new user devices within the G-U group.

In the embodiment described here, the communication system 1 also comprises:

a verification device 4, capable of verifying the group signatures sent on behalf of the group G-U by each of the user devices 2-1, 2-2, . . . , 2-N. In the example shown in FIG. 1, this verification device 4 is a third-party device, external to the G-U group. As a variant however this verification device 4 can be integrated into each of the user devices 2-n, n=1, . . . , N of the group G-U to allow the user devices to verify the communications coming from other user devices of the group; and an opening authority (or device) 5, here solely capable of lifting the anonymity of a generated group signature by one of the user devices 2-n, n=1, . . . , N.

No limitation is attached to the nature of the verification device 4 and of the opening authority 5. It can be any type of communication device (ex. computers, smart telephone, etc.).

Figure 2:
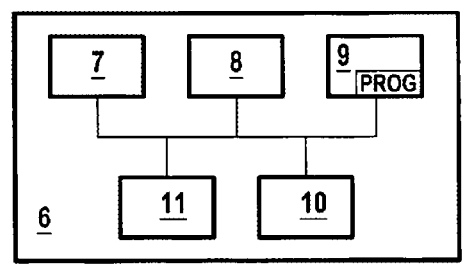
FIG. 2 illustrates the material architecture of user devices of a group, of a device manager of the group, of a verification device and of an opening device of the communication system of the FIG. 1.

In the embodiment described here, the user devices 2-n, n=1, . . . , N, the device manager of the group 3, the verification device 4 and the opening authority 5 all have the material architecture of a computer 6, such as shown schematically in FIG. 2.

The computer 6 comprises especially a processor 7, a read-only memory 8, a random access memory 9, a non-volatile memory 10 and communication means 11. These communication means 11 allow the user devices, the verification device and the opening authority to communicate between each other especially. They can comprise one or more communication interfaces on one or more telecommunication networks (fixed or mobile, wired or wireless, etc.).

The read-only memory 8 of the computer 6 constitutes a recording carrier according to the invention, readable by the processor and on which is registered a computer program according to the invention, designated generally here by PROG, comprising instructions for execution of one of the methods forming the object of the invention, according to the relevant device. In this way:

for the user devices 2-1, ..., 2-N, the program PROG is a program PROG2 comprising instructions for execution of the steps of the cryptographic method for signing a message m according to the invention;

for the device manager of the group 3, the program PROG is a program PROG3 comprising instructions for execution of the steps of the cryptographic method of providing a certificate according to the invention;

for the verification device 4, the program PROG is a program PROG4 comprising instructions for execution of the steps of the cryptographic method of verification of a group signature according to the invention; and for the opening authority 5, the program PROG is a program PROG5 comprising instructions for execution of the steps of the cryptographic method for opening a group signature according to the invention.

By way of equivalent each of these programs defines functional modules of the device on which it is installed, capable of performing the steps of the method concerned and based on the hardware elements 7-11 of the computer 6.

In this way, the program PROG2 defines the functional modules of each user device 2-n, n=1, ..., N, and more particularly here:

a selection module 2A configured to select, during its enrolment in the group G-U with the device manager of the group 3, a secret u(n) allowing it to generate a group signature and which it keeps secret with respect to the other devices;

a proof module 2B, configured to prove to the device manager of the group 3 knowledge of the secret u(n);

a receiving module 2C, activated after the proof module has proved knowledge of the secret u(n) to the device manager of the group 3, of a certificate C(2-n) provided by the device manager of the group 3 and composed of three elements S1, S2, S3, described in more detail later; and a generation module 2D, configured to generate a group signature (i.e. on behalf of the group G-U) for any message m, from the certificate (S1,S2,S3) provided by the device manager of the group 3, this group signature noted SIG(m) itself comprising three elements T1, T2 and T3 described in more detail later.

Similarly, the program PROG3 defines the functional modules of the device manager of the group 3, and more particularly here:

a module for obtaining 3A, configured to obtain from a user device joining the group G-U proof of knowledge by this user device of a secret it has selected to generate signatures on behalf of the group G-U;

a selection module 3B, configured to select a variate r for the user device in question;

a generation module 3C, configured to generate a certificate for this user device, comprising the three elements S1, S2, S3 mentioned previously and described in more detail later; and a module for sending 3D, configured to send the generated certificate to the relevant user device.

The program PROG4 defines the functional modules of the verification device 4, and more particularly here:

a module for obtaining 4A, configured to obtain a public key of the group G-U to execute verification of signatures generated on behalf of this group;

a verification module 4B, configured to verify if particular equality requiring calculation of a bilinear coupling and detailed later is verified, when this equality is applied to the elements of a group signature which it receives for verification; and a validation module 4C of the group signature which it has received for verification, activated if said equality is verified.

Finally, the program FROG 5 defines the functional modules of the opening authority 5, and more particularly here:

a first receiving module 5A, capable of receiving originating from each user device 2-n having enrolled the group G-U, of a particular element dependent on the secret u(n) selected by this user device to generate signatures on behalf of the group G-U;

a second receiving module 5B, capable of receiving a group signature to be opened;

a module of opening 5C of the group signature revue by the module 5B, configured to identify as native user device of the group signature, the (sole) user device of the group of user devices for which two terms evaluated from the bilinear coupling e, the elements of the received signature, and the elements received by the first receiving module 5A are equal.

In another embodiment, all or some of the user devices 2-n, n=1, ..., N integrate a silicon chip and communication means with the other devices of the communication system 1 especially. The silicon chip comprises transistors adapted to constitute logic gates of a non-programmable cabled logic for performing the steps of the cryptographic method for signature according to the invention.

In reference to FIGS. 3 to 6, the main steps of the methods cryptographic forming the objects of the invention (method of providing a certificate, signature method, verification method of a group signature and method of opening a group signature), in a particular embodiment will now be described.

As for all the existing mechanisms of group signature, the invention is based on operations carried out in a bilinear environment comprising three cyclic groups G1, G2 and GT of order p, where p designates a prime integer, and a bilinear coupling e inputting an element of G1 and an element of G2 and having values in GT. Such a bilinear environment is classically used in cryptography and can be implemented very easily. It is not given in more detail here. An example of such a bilinear environment which can be used in terms of the invention, and especially of a bilinear coupling e, is described for example in the document by F. Vercauteren titled "Optimal Pairings", IEEE Transactions on Information Theory, vol. 56, no. 1, January 2010, or in the book by J. Silverman titled «The Arithmetic of Elliptic Curves», in chapter XI.

Throughout the description scalar designates a whole number of the group $Z_p$ of the integers modulo p.

The methods forming the objects of the invention are all based on the public key of the group pkG-U, and for the method of providing a certificate, on the secret key sk3 of the device manager of the group 3. These cryptographic keys are determined from secret variates (scalars) x, y and z, which can be generated (plus the keys) as is known per se by a trusted authority, or cooperatively among several entities.

More particularly, according to the invention the public key pkG-U is formed by a plurality of elements comprising:

an element g and an element $Z=g^z$ of G1; and an element h, an element $X=h^x$, an element $Z'=h^{1/z}$ and an element $Y'=h^{y/z}$ of G2.

This key is shared by all user devices $2\text{-}n$, $n=1, \ldots, N$ of the group G-U. It is also public and therefore accessible by third parties.

The secret key sk3 of the device manager 3 of the group G-U is formed from the secret variates x and y or, in a variant embodiment, from the elements $g^x$ and $g^y$. This key is known to the device manager 3 of the group only (and to the trusted authority which generated it, if appropriate).

In reference to FIG. 3, the main steps of a cryptographic method of providing a certificate according to the invention, will now be described in a particular embodiment wherein it is executed by the device 3 manager of the group G-U to provide a certificate to a user device 2-N0 joining the group G-U.

It is supposed here that the secret key sk3 of the device manager 3 of the group G-U is constituted by secrets x and y.

Via its selection module 2A the user device 2-N0 wanting to rejoin the group G-U selects a secret scalar u(N0) (step E10). The secret u(N0) is for example a scalar generated randomly by the user device 2-N0. It stores it as its secret key, for example in its non-volatile memory.

Figure 3:
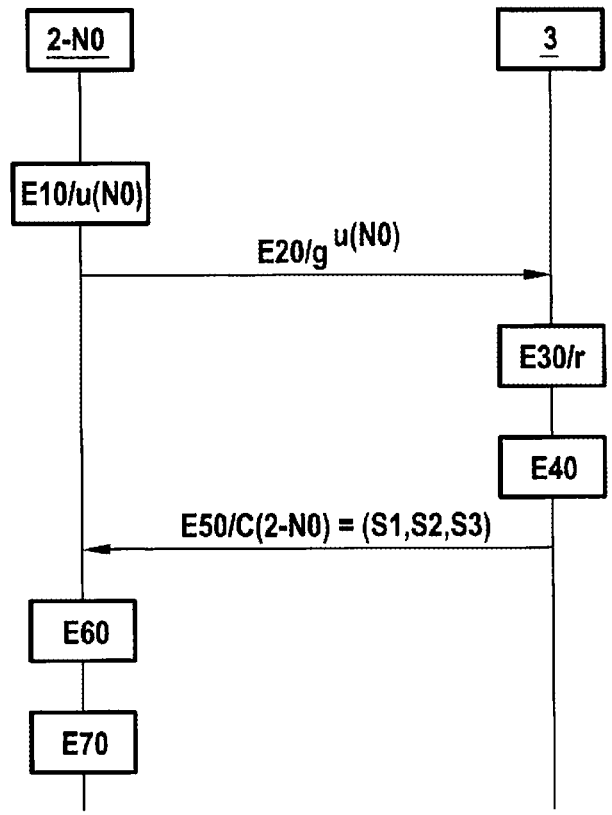
FIG. 3 illustrates the steps of a method of providing of a certificate according to the invention in a particular embodiment.

In the embodiment described here, the user device 2-N0 then calculates and sends the element $h^{u(N0)}$ to the opening authority 5 (step not shown in FIG. 3).

The user device 2-N0 also calculates the element $g^{u(N0)}$ then sends it by way of its proof module 2B to the device manager 3 of the group to prove knowledge of the secret u(N0) (step E20). This proof of knowledge is for example brought to the device manager 3 of the group by implementing a Schnorr algorithm, known to the skilled person. This algorithm is described for example in the document by C. P. Schnorr titled "Efficient Identification and signatures for smart cards", Advances in Cryptology, CRYPTO'89, LNCS 435, pp 239-252, 1990.

If the proof of knowledge of the secret u(N0) is validly brought to the device manager 3 of the group G-U (and more particularly to its module for obtaining 3A) by the user device 2-N0, via its selection module 3B the device manager 3 of the group selects a scalar variate r(N0) for the user device 2-N0 (step E30).

Via its generation module 3C it then generates, from the public key pkG-U of the group G-U, from its secret key sk3=(x,y) and from the variate r, a certificate C(2-N0) for the user device 2-N0 (step E40). This certificate comprises three elements, specifically:

an element $S1=g^r$ belonging to the group G1;

an element $S2=g^{r(x+y \cdot u)}$ belonging to the group G2; and an element $S3=g^{z \cdot r}$ belonging to the group GT.

The device manager 3 of the group sends the certificate C(2-N0) generated in this way to the user device 2-N0 via its module for sending 3D (step E50).

Via its receiving module 2C, the user device 2-N0 receives the certificate C(2-N0) generated by the device manager 3 of the group and stores it, for example in its non-volatile memory (step E60). On completion of step E60 the user device 2-N0 can then sign messages on behalf of the group by using the certificate provided by the device manager 3 of the group G-U.

In keeping with the invention, the user device 2-N0 does not directly use the certificate C(2-N0) provided by the device manager 3 of the group to generate its signatures on behalf of the group G-U, but a certificate C'(2-N0) derived from the certificate C(2-N0). This certificate derived from the certificate C(2-N0) advantageously generates a group signature not containing any non-interactive proof of knowledge.

More specifically, the certificate C'(2-N0) used by the user device 2-N0 to generate its signatures on behalf of the group G-U comprises the elements S1 and S2 of the certificate C(2-N0), as well as an element S3' corresponding to the element S3 of the certificate C(2-N0) raised to the power u(N0), where u(N0) designates the secret key of the user device 2-N0 generated at step E10, or:

$$S3'=S3^{u(N0)}$$

$$C'(2\text{-}N0)=(S1,S2,S3')$$

The certificate C'(2-N0) can be generated by the user device 2-N0 once the certificate C(2-N0) is received, that is, prior to completing any signature on behalf of the group G-U (step E70). This enables it to be generated a single time for all signatures which will be generated by the user device 2-N0 on behalf of the group G-U. It is stored by the user device 2-N0 in its non-volatile memory for example.

In a variant embodiment, as mentioned previously, the secret key sk3 of the device manager 3 of the group G-U is composed of the elements $g^x$ and $g^y$. This variant differs from the embodiment previously described and shown in FIG. 3 in that it comprises as replacement of step E20 a step E20' of receiving the element $g^y$ by the user device 2-N0, originating from the device manager 3 of the group, and a step E20" of calculation and sending by the user device 2-N0 to the device manager 3 of the group, the element $(g^y)^{u(N0)}$ to prove knowledge of the secret u(N0) from the Schnorr algorithm. The other steps E10, E30-E70 remain unchanged.

Figure 4:
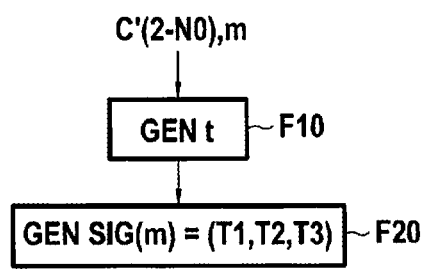
FIG. 4 illustrates the steps of a signature method according to the invention in a particular embodiment.

The way in which the modified certificate C'(2-N0) generated at step E70 by the user device 2-N0 is used by the latter to generate a signature SIG(m) on behalf of the group G-U for a message m will now be described. The steps of the signature method according to the invention performed for this purpose by the user device 2-N0 are illustrated in FIG. 4. In the embodiment described here they follow steps E60 and E70 described previously in reference to FIG. 3.

It is assumed here that the message m which the user device 2-N0 has to sign is represented by a whole number.

Via its 2D generation module the user device 2-N0 generates a variate scalar noted t for signing the message m (step F10).

Then from the elements S1, S2 and S3' of the certificate C'(2-N0) it calculates the following elements T1 (belonging to the group G1), T2 (belonging to the group G2) and T3 (belonging to the group GT) (step F20):

$$T1=S1^t$$

$$T2=(S2 \cdot S1^{u(N0) \cdot m})^t$$

$$T3=(S3')^t=S3^{u \cdot t}$$

The signature SIG(m) of the message m generated by the user device 2-N0 on behalf of the group G-U is then formed from the three elements T1, T2 and T3 calculated in this way by the module 2D.

This signature SIG(m) is sent by the user device 2-N0 to accompany the message m to a device or an entity on which or to which the message m is intended to prove to this device or this entity that it is the user device 2-N0 which is at the origin of the message m.

Figure 5:
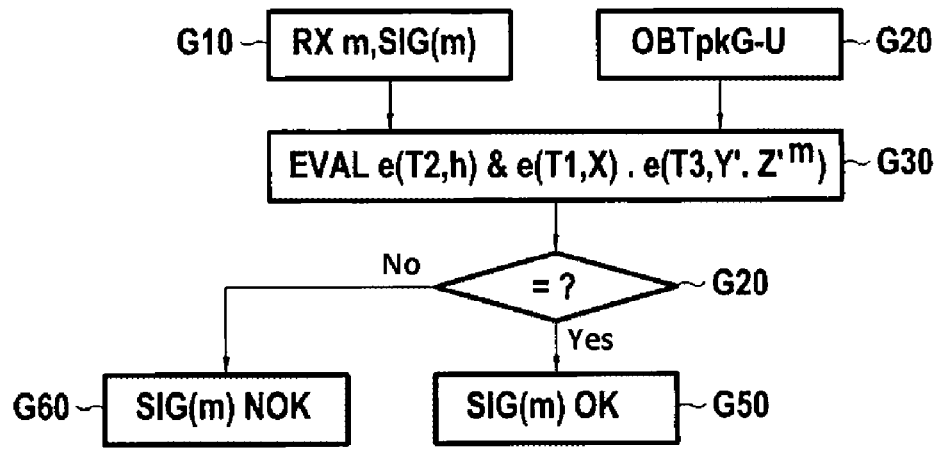
FIG. 5 illustrates the steps of a verification method of a group signature according to the invention in a particular embodiment.

In reference to FIG. 5, the main steps performed for verifying that a group signature generated in this way and accompanying a message m is fully valid will now be described. In the embodiment described here these steps are performed by the verification device 4.

It is assumed here that the verification device 4 receives a message m and a signature SIG(m) accompanying this message, generated according to the invention (step G10). The signature SIG(m) comprises the three elements T1, T2 and T3 calculated at step F20 previously described in reference to FIG. 4.

It is also assumed here that the verification device 4 knows the public key pkG-U of the group G-U (step G20). Since this key is public, no limitation is attached to the way in which the verification device 4 has obtained it via its module for obtaining 4A (for example by consulting the trusted authority having generated it or from the device manager 3 of the group G-U).

To verify the signature SIG(m) and ensure that it has been generated by a member of the group G-U, by means of its verification module 4B and by using the public key pkG-U, the verification device 4 here calculates the term e(T2,h), where e designates the bilinear coupling of the bilinear environment considered for executing the invention and introduced previously.

The verification module 4B also calculates the term:

$$e(T1,X).e(T3,Y'.Z'^m)$$

Then it compares the two terms it has just calculated (step test G40).

If the equality between the two terms is verified (positive response at the test step G40), this means that the signature is valid, and the module 4C of the verification device validates the signature SIG(m) (step G50).

If not (response not at the test step G40), the signature is invalidated and rejected by the module 4C (step G60).

It is noted that verification of the signature SIG(m) is done by the verification device 4 without knowledge of the user device at the origin of this signature. This verification merely determines that the signature in question has been generated by a member of the group G-U.

Figure 6:
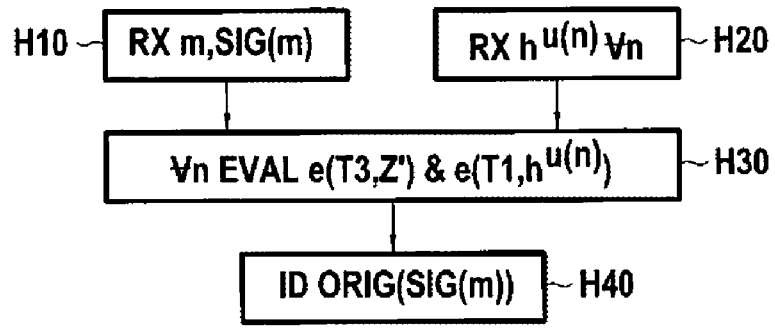
FIG. 6 illustrates the steps of a method of opening a group signature according to the invention, in a particular embodiment.

In reference to FIG. 6, the main steps performed to open a group signature SIG(m) generated for a message m by means of the signature method according to the invention will now be described. In the embodiment described here these steps are performed by the opening authority 5.

It is assumed here that via its second receiving module 5B the opening authority 5 therefore receives a signature SIG(m) to be opened generated for example by the user device 2-N0 according to the invention (step H10). The signature SIG(m) comprises the three elements T1, T2 and T3 calculated at step F20 previously described in reference to FIG. 4.

For simplification it is assumed here that the user device 2-N0 is one of the user devices 2-n, n=1, ..., N of the group G-U.

According to what has been described in reference to FIG. 3, each user device 2-n of the group G-U a, when rejoining the group G-U, transmits to the opening authority 5 the element $h^{u(n)}$ calculated from the element h of the public key pkG-U of the group and its secret key u(n) (cf. step E10 illustrated in FIG. 3). These elements have been received successively by the first module 5A for receiving the opening authority 5 and stored for example in its non-volatile memory 5 in association with the identifiers of the user devices having generated them (step H20).

Following receipt of the signature SIG(m) to be opened, via its module of opening 5C, the opening authority 5 calculates by means of the public key pkG-U of the group G-U, for each element $h^{u(n)}$ received from a user device 2-n, n=1, ..., N of the group G-U the following terms e(T3, Z') and e(T1,$h^{u(n)}$) where e designates the bilinear coupling previously introduced and used especially for verification of the signature (step H30).

The module of opening 5C then identifies the single user device 2-n (in this case n=N0 here) for which the two calculated terms are equal (step H40), and determines that this user device is at the origin of the signature SIG(m). This property follows on advantageously from the properties of the bilinear coupling e and in the way in which the signature has been generated.

Although the present disclosure has been described with reference to one or more examples, workers skilled in the art will recognize that changes may be made in form and detail without departing from the scope of the disclosure and/or the appended claims.

The invention claimed is:

1. A cryptographic method comprising:
signing a message m, by a user device, on behalf of a group, said group being managed by a group manager having a secret key generated from two variates x and y, said group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p, said signing comprising:
receiving, after having proved to the manager of the group knowledge of a secret u selected by the user device, a certificate C provided by the manager of the group comprising an element $S1=g^r$, an element $S2=g^{r(x+y \cdot u)}$ and an element $S3=g^{z \cdot r}$ where r designates a variate selected by the manager of the group for said user device; and
generating a group signature for the message m, from the certificate provided by the manager of the group, a variate t generated by the user device, and the secret u, said generated group signature comprising an element $T1=S1^t$, an element $T2=(S2.S1^{u \cdot m})^t$ and an element $T3=S3^{ut}$.

2. The cryptographic method according to claim 1 comprising calculating an element S3' from the element S3 of the certificate provided by the manager of the group by elevating the element S3 to the power u, said element T3 being calculated during the step of generating the signature by elevating the element S3' calculated during the step of calculating to the power t.

3. The cryptographic method according to claim 1 wherein the secret key of the manager of the group is formed from the variates x and y and wherein, to prove knowledge of the secret u to the manager of the group, the user device sends the element $g^u$ to the manager of the group.

4. The cryptographic method according to claim 1 wherein the secret key of the group manager is formed from the elements $g^x$ and $g^y$ and wherein, to prove knowledge of the secret u to the manager of the group, the user device:
receives the element $g^y$ from the manager of the group; and calculates and sends the element $(g^y)^u$ to the manager of the group.

5. The cryptographic method according to claim 1 wherein the user device proves knowledge of the secret u to the manager of the group by using the Schnorr algorithm.

6. The cryptographic method according to claim 1 comprising:

verifying by a verification device the group signature comprising the elements T1, T2 and T3, and generated for the message m by the user device, said verifying comprising:

verifying the equality $e(T2,h)=e(T1,X).e(T3,Y'.Z'^m)$, where e designates a bilinear coupling defined on the cyclic groups G1 and G2 and having values in the cyclic group GT; and in response to said equality being verified, validating the group signature.

7. A cryptographic method comprising:

providing a certificate by a manager device of a group to a user device joining the group, said group manager device having a secret key generated from two variates x and y, said group having a public key formed by a plurality of elements comprising an element g and an element $g^z$ belonging to a cyclic group G1 of order p, p designating a prime integer and z a variat, and an element h, an element $h^x$, an element $h^{1/z}$ and an element $h^{y/z}$ belonging to a cyclic group G2 of order p, said providing comprising:

obtaining, originating from the user device, proof of knowledge by said user device of a secret u selected by the user device;

selecting a variate r for the user device;

generating a certificate for the user device comprising an element $S1=g^r$, an element $S2=g^{r(x+y.u)}$ and an element $S3=g^{z.r}$; and sending the generated certificate to the user device.

8. A user device capable of signing a message m on behalf of a group, said group being managed by a group manager having a secret key generated from two variates x and y, said group having a public key formed by a plurality of elements comprising an element g and an element $g^z$ belonging to a cyclic group G1 of order p, p designating a prime integer and z a variate, and an element h, an element $h^x$, an element $h^{1/z}$ and an element $h^{y/z}$ belonging to a cyclic group G2 of order p, said user device comprising:

a processor; and a non-transitory computer-readable medium comprising instructions which when executed by a processor of the user device, configure the user device to:

select a secret u;

a prove knowledge of the secret u to the manager of the group;

receive, after the user device has proved to the manager of the group knowledge of the secret u, a certificate C provided by the manager of the group comprising an element $S1=g^r$, an element $S2=g^{r(x+y.u)}$ and an element $S3=g^{z.r}$ where r designates a variate selected by the manager of the group for said user device; and generate a group signature for the message m, from the certificate provided by the manager of the group, a variate t generated by the user device, and the secret u, said generated group signature comprising an element $T1=S1^t$, an element $T2=(S2.S1^{u.m})^t$ and an element $T3=S3^{u.t}$.

* * * * *